US012789785B2

(12) United States Patent
Rostiti et al.

(10) Patent No.: US 12,789,785 B2
(45) Date of Patent: Nov. 10, 2026

(54) HYBRID POWERTRAIN ENGINE SPEED AND POSITION ESTIMATION FOR PULSE COMPENSATION

(71) Applicant: FCA US LLC, Auburn Hills, MI (US)

(72) Inventors: Cristian Rostiti, Auburn Hills, MI (US); Bilal Catkin, Auburn Hills, MI (US); Nadirsh D Patel, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 54 days.

(21) Appl. No.: 19/073,573

(22) Filed: Mar. 7, 2025

(65) Prior Publication Data

US 2026/0264665 A1 Sep. 10, 2026

(51) Int. Cl.

*B60W 10/06* (2006.01)
*B60W 10/08* (2006.01)
*B60W 20/40* (2016.01)

(52) U.S. Cl.

CPC ............ *B60W 20/40* (2013.01); *B60W 10/06* (2013.01); *B60W 10/08* (2013.01); *B60W 2510/0638* (2013.01); *B60W 2510/0657* (2013.01); *B60W 2710/083* (2013.01)

(58) Field of Classification Search

CPC ...... B60W 10/06; B60W 10/08; B60W 20/40; B60W 2510/0638; B60W 2510/0657; B60W 2710/083

See application file for complete search history.

(56) References Cited

U.S. PATENT DOCUMENTS

2009/0112385 A1* 4/2009 Heap ...................... B60K 6/445 180/65.21
2009/0118914 A1* 5/2009 Schwenke .............. B60K 6/547 701/99
2017/0225670 A1* 8/2017 Johri ..................... B60W 10/06

* cited by examiner

*Primary Examiner* — Tinh T Dang

(74) *Attorney, Agent, or Firm* — Jeremy J. Klobucar

(57) ABSTRACT

A hybrid electric vehicle (HEV) includes an electrified powertrain and driveline including an internal combustion engine, a first electric motor configured as a starter/generator, and a second electric motor configured as an electric traction motor. A powertrain control system includes a controller having a compensation algorithm to estimate engine pulses based on engine position and speed data. The powertrain control system is programmed to determine the HEV is active, determine an activation request for the engine, predict a position and speed of the engine to reduce closed loop measurement and actuation delays of the controller to zero, determine a motor torque to compensate for the engine pulses based on the predicted position and speed of the engine, and operate the first and/or second electric motors with the determined motor torque to compensate for the engine pulses.

20 Claims, 6 Drawing Sheets

150
20
42

HYBRID POWERTRAIN ENGINE SPEED AND POSITION ESTIMATION FOR PULSE COMPENSATION

FIELD

The present application relates generally to hybrid electric vehicle control systems and, more particularly, to a vehicle control system configured to compensate for time delays in automotive drivelines.

BACKGROUND

Hybrid-electric vehicle (HEV) powertrains have become more advanced with increasingly complex control architectures. However, these powertrains are often susceptible to nonlinear behaviors that can negatively impact cabin comfort or create an unnatural driving experience. Such behaviors may include engine activation while the vehicle is in motion or the effects of backlash and shaft stiffness, which are particularly noticeable when the engine is inactive. Thus, accurate estimation of crucial quantities in automotive drivetrain systems is essential for optimizing performance, durability, and emissions. However, the presence of time delays, arising from task scheduling and communication latency between control units, can potentially hinder the effectiveness of advanced control algorithms. Accordingly, while such conventional systems do work well for their intended purpose, there is a desire for improvement in the relevant art.

SUMMARY

In accordance with one example aspect of the invention, a hybrid electric vehicle (HEV) is provided. In one example implementation, the HEV includes an electrified powertrain and driveline including an internal combustion engine, a first electric motor configured as a starter/generator, and a second electric motor configured as an electric traction motor. A powertrain control system includes a controller having a compensation algorithm to estimate engine pulses based on engine position and speed data. The powertrain control system is programmed to determine the HEV is active, determine an activation request for the engine, predict, by the compensation algorithm, a position and speed of the engine to reduce closed loop measurement and actuation delays of the controller to zero, determine, by the controller, a motor torque to compensate for the engine pulses, based on the predicted position and speed of the engine, and operate the first and/or second electric motors with the determined motor torque to compensate for the engine pulses.

In addition to the foregoing, the described HEV may include one or more of the following features: wherein when predicting the position and speed of the engine, the powertrain control system is further programmed to receive, by the controller, engine position and speed measurements, estimate, by the controller, engine position and speed variation caused by the engine pulses; and estimate, by the controller and a physics-based model, system dynamics of the engine after a time step M+A to thereby predict future system dynamics, where M corresponds to a measurement delay associated with the powertrain control systems, and where A corresponds to an actuation delay associated with the powertrain control system and the electrified powertrain and the driveline.

In addition to the foregoing, the described HEV may include one or more of the following features: wherein the controller utilizes a Kalman filter with the received engine position and speed variation as measurement updates; wherein the controller further utilizes a cylinder torque model configured to estimate a torque signature of the engine during a start when the engine is put in rotation without firing cylinders of the engine; wherein when predicting the position and speed of the engine, the powertrain control system is further programmed to perform a first measurement feedback update through the Kalman filter utilizing (i) the previously received engine position and speed measurement and (ii) the estimated engine position and speed variation caused by the engine pulses; and wherein when predicting the position and speed of the engine, the powertrain control system is further programmed to perform a second measurement feedback update through the Kalman filter utilizing a buffer crank position as a measurement update.

In addition to the foregoing, the described HEV may include one or more of the following features: wherein the electrified powertrain and driveline further includes an electrically variable transmission with a power splitting planetary gear set; wherein the electrified powertrain and driveline are absent a clutch to disconnect the engine from the electrified powertrain; wherein the first electric motor is configured to actuate the engine; wherein the engine is wired to the controller to provide a buffer-crank measurement of engine speed and position with negligible delay.

In accordance with another example aspect of the invention, a method of operating an electrified power-split hybrid powertrain of a hybrid electric vehicle (HEV) is provided. The HEV includes a driveline with an internal combustion engine, a first electric motor configured as a starter/generator, and a second electric motor configured as an electric traction motor. In one example implementation, the method includes determining the HEV is active, determining an activation request for the engine, predicting, by a controller having a compensation algorithm to estimate engine pulses based on engine position and speed data, a position and speed of the engine to reduce closed loop measurement and actuation delays of the controller to zero, determining, by the controller, a motor torque to compensate for the engine pulses, based on the predicted position and speed of the engine, and operating, by the controller, the first and/or second electric motors with the determined motor torque to compensate for the engine pulses.

In addition to the foregoing, the described method may include one or more of the following features: wherein when predicting the position and speed of the engine, the method includes: receiving, by the controller, engine position and speed measurements; estimating, by the controller, engine position and speed variation caused by the engine pulses; and estimating, by the controller and a physics-based model, system dynamics of the engine after a time step M+A to thereby predict future system dynamics, where M corresponds to a measurement delay associated with the powertrain control systems, and where A corresponds to an actuation delay associated with the powertrain control system and the electrified powertrain and the driveline.

In addition to the foregoing, the described method may include one or more of the following features: utilizing, by the controller, a Kalman filter with the received engine position and speed variation as measurement updates; utilizing, by the controller, a cylinder torque model configured to estimate a torque signature of the engine during a start when the engine is put in rotation without firing cylinders of the engine; wherein when predicting the position and speed of the engine, the method further includes performing, by the controller, a first measurement feedback update through the Kalman filter utilizing (i) the previously received engine position and speed measurement and (ii) the estimated engine position and speed variation caused by the engine pulses; and wherein when predicting the position and speed of the engine, the method further includes performing, by the controller, a second measurement feedback update through the Kalman filter utilizing a buffer crank position as a measurement update.

In addition to the foregoing, the described method may include one or more of the following features: wherein the electrified power-split hybrid powertrain and driveline further include an electrically variable transmission with a power splitting planetary gear set; wherein the electrified power-split hybrid powertrain and driveline are absent a clutch to disconnect the engine from the electrified powertrain; wherein the first electric motor is configured to actuate the engine; wherein the engine is wired to the controller to provide a buffer-crank measurement of engine speed and position with negligible delay.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
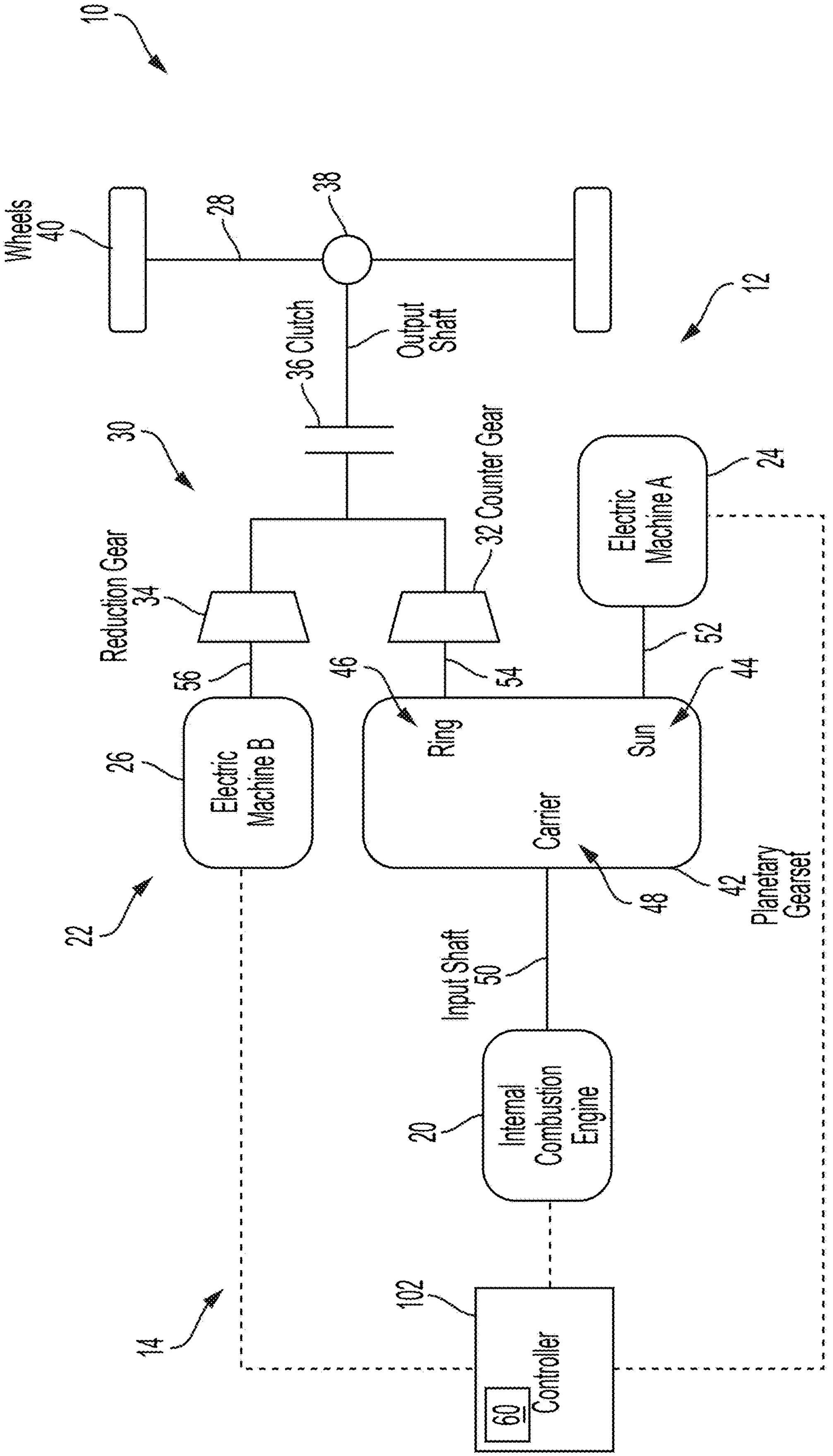
FIG. 1 is a schematic illustration of an example hybrid electric vehicle (HEV) architecture in accordance with the principles of the present application.

As discussed above, a hybrid electric vehicle (HEV) powertrain includes both an internal combustion engine and one or more electric traction motors (e-motors) to propel the vehicle, for example, in an EV mode (e-motor only) or a hybrid mode (engine & e-motor). Accurate estimation of crucial quantities in automotive drivetrain systems is essential for optimizing performance, durability, and emissions. However, the presence of time delays, arising from task scheduling and communication latency between control units, can significantly hinder the effectiveness of advanced control algorithms. Closed loop performance is often limited by the equivalent time delay between the control action command, its effect on the system, and the measurement of the reaction. Frequently, commands and measurements originate from difference sources, requiring precise coordination to accurately estimate the driveline response.

Accordingly, described herein are systems and methods for a model-based approach that integrates Kalman filtering with horizon prediction techniques to effectively address time delay compensation. By leveraging the descriptive capabilities of physics-based models, the described techniques enable the system to overcome synchronization misalignment between commands, actuations, and measurements. As information arrives from various sources, the algorithm processes it precisely to reconstruct the actual effect on the driveline shafts. This enhanced estimation of critical quantities enables improved performance in advanced algorithms. The techniques may be particularly useful for engine pulse cancellation in hybrid powertrains. Accordingly, the system accurately estimates critical driveline quantities, thereby enabling improved drivetrain control accuracy and overall drivability performance.

In general, the systems and methods described herein improve drivability in hybrid powertrains (e.g., HEVs, PHEVs) where there is no clutch available to disconnect the engine from the rest of the powertrain, for example, in commercially available power-split architectures like electronically controlled continuously variable transmissions (eCVTs) and single input electrically variable transmissions (SIEVTs). Specifically, the system is configured to predict engine pulses during engine start by utilizing a horizon-based estimator, with stiffness and other nonlinearity of the driveline being considered along with the presence of time delays.

To overcome the limitations of conventional systems, the described system is configured to mitigate the limitations imposed by delays through the strategic utilization of a physics-based system model, which predicts the driveline status while concurrently adjusting the estimation process using delayed data. The described strategy effectively addresses current limitations with algorithms for time-delayed systems that exhibit both robustness to noise and uncertainties, while also maintaining computational efficiency.

Specifically, a horizon-based estimator is employed, iteratively projecting forward from the earliest received measurement at the CPU where the advanced control algorithm oversees the system of interest. The estimator extends its predictions to encompass the earliest command requiring transmission. To refine the estimation of crucial quantities, a Kalman Filter-based update mechanism is incorporated, which is triggered upon the arrival of measurements at the control unit of interest. This approach effectively safeguards the estimation process from deviations arising from unmodeled dynamics and noise. A key advantage of this strategy lies in its efficient computational approach. By employing a single, iteratively updated model that incorporates only the most critical dynamics for prediction, significant computational savings are achieved compared to conventional methods. These techniques may be advantageously applied to mitigate engine pulses in a PHEV configuration during engine starts.

With initial reference to FIG. 1, a schematic diagram of a hybrid electric vehicle (HEV) 10 having a power-split hybrid powertrain 12 and a powertrain control system 14 is illustrated according to the principles of the present disclosure. However, it will be appreciated that the systems and methods described herein may be applied to various other powertrain configurations. In the illustrated example, the powertrain 12 generally includes an internal combustion engine 20 and an electrically variable transmission (EVT) 22, which includes a first electric motor 24 (starter/generator) and a second electric motor 26 (traction). In the example embodiment, the engine 20 combusts a mixture of air and fuel (e.g., gasoline) within cylinders to drive pistons and generate drive torque to a front or rear axle 28 via a driveline 30 that includes a counter gearset 32, a reduction gearset 34, a clutch 36, and a final drive (differential) 38. The motors 24, 26 are powered by a high voltage battery system having one or more high voltage traction batteries (not shown).

In the example implementation, the engine output is coupled to the EVT 22 to deliver driving power through the driveline 30 to the vehicle wheels 40. The EVT 22 power split includes a single power splitting planetary gear set 42 along with the motors 24, 26 and gearsets 32, 34, but it will be appreciated that various gear reduction configurations can be employed. As illustrated in FIG. 1, planetary gear set 42 generally includes a sun gear 44, a ring gear 46, and a carrier 48 configured to rotatably support a plurality of planet or pinion gears (not shown) in meshing engagement with both the sun gear 44 and the ring gear 46.

In the example configuration, the output of engine 20 is coupled to a torsional vibration damper, which can include a torque limiting device (not shown). An input member 50 is coupled to the carrier 48, and the pinion gears are in continuous meshing engagement between the sun gear 44 and the ring gear 46. The sun gear 44 is continuously non-rotatably coupled to the first electric motor 24 via a shaft or connecting member 52 for common rotation therewith. An inner diameter of the ring gear 46 is in continuous meshing engagement with the pinion gears, while an outer diameter of the ring gear 46 gear is in continuous meshing engagement with an output shaft 54 and the counter gearset 32. The second electric motor 26 includes an output shaft or connecting member 56 connected to the reduction gearset 34.

During normal operation, the electric motors 24, 26 collaboratively generate specific torque levels to maintain an optimal balance of torques and speeds within the planetary gear set 42. The second electric motor 26, characterized by its larger size and greater power capacity, is capable of propelling the vehicle 10 independently, without reliance on the engine 20. When additional power is required, the engine 20 is activated, primality utilizing the torque supplied by the first electric motor 24.

In powertrain configurations where the engine is actuated by the electric motor, vibrations can propagate through the vehicle due to engine pulses. These engine pulses are characterized by the oscillatory nature of the resistance torque exerted by the engine when not in combustion mode. This phenomenon arises from the pressure fluctuations within non-firing cylinders as the air inside is compressed and expanded during engine shaft rotation, with the valves remaining closed. This is commonly observed in engines equipped with hydraulic valve lifters, where all intake valves are closed due to the absence of oil pressure. The periodic nature of piston events contributes to the oscillatory nature of this resistance torque. If not adequately compensated, engine pulses can adversely impact powertrain speed, leading to perceptible vibrations for the driver.

As the engine is rotating while not firing, due to the air trapped in the cylinders, a specific pressure may be formed within the cylinders causing an equivalent pulsating torque at the engine shaft as the pistons move within the cylinders.

Often, either closed-loop strategies, or physics-based strategies are used to actively compensate for this oscillatory torque by commanding a specifically shaped and timed torque to the electric motor(s). A primary strategy for mitigating engine pulses involves employing algorithms to estimate these pulses based on the engine position and speed data. Subsequently, compensatory torques are calculated to counteract the effects of these pulses. Effective pulse compensation necessitates meticulous handling of the time delays and synchronization. Typically, pulse compensation strategies utilize specific equivalent models of the powertrain to emulate the torque propagated to the shaft. These models enable the cancellation of pulsating torque from the engine through strategic variations in motor torque, in addition to the commanded torque from the supervisory controller. The efficacy of this strategy hinges on the precise synchronization between the torque estimation and the actuation of the motors (ideally, closed loop equivalent delay equal to zero). If measurement and actuation delays are not adequately addressed, relying solely on measured speeds to estimate pulsating torque can result in commands that arrive too late at the shaft, rendering the strategy ineffective.

As such, the presence of measurement and actuation delays can significantly influence the effectiveness of the compensation process. To achieve optimal pulse cancellation, it is important to calculate compensatory torques in a proactive manner. Estimating engine pulses from crank position data is a fundamental component of the compensation process. Accurate prediction of crank position is additionally important for mitigating the impact of time delays. In short, engine pulsations during engine start are to be compensated to prevent vibration, algorithms that are typically used rely on timely position and speed information and a fast actuation chain, both measurement and actuation are often affected by delays, and an estimation/prediction of engine speed and position is needed to allow compensation algorithms to perform their function correctly.

Accordingly, the systems and methods described herein are configured to predict the speed and position of the engine 20 in an “actuation time delay” (a) in advance, using measurement affected by “measurement time delay” (m) utilizing a physics-based model of the powertrain. At each sampling time of the CPU where the compensation algorithm resides, this algorithm goes through ‘m+a’ steps (equivalent to the total closed loop time delay, meaning time from commanding an actuation and receiving the measured effect). In each step, the algorithm computes the system dynamics, practically estimating the status of the system after a time step. This estimation starts from the latest received measurement, and “projects forward” the dynamic. In general, the system utilizes the information from the measurement (the past), to predict how the system will behave in the future, based on commands that have been sent, but have not yet arrives to the system because of delay (future). This is done to predict the status of the system that is “synchronized” with the command from the CPU of interest.

The proposed system involves two distinct timeframes: (i) the command time, during which speed reference profiles and motor torques are transmitted to a motor control processor (MCP) 60, and (ii) the actuation time, when the commanded motor torques are applied to the engine 20.

Figure 2:
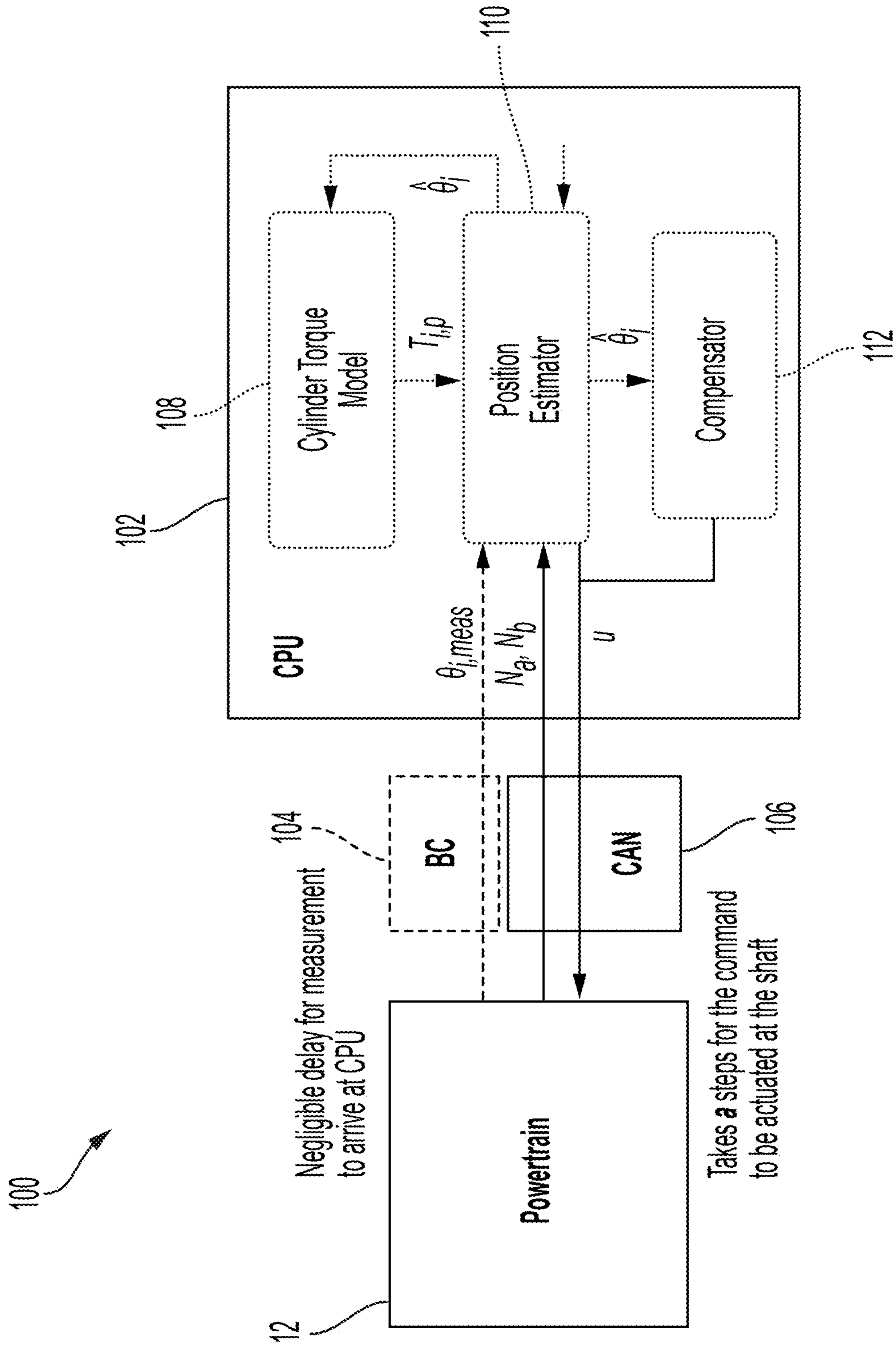
FIG. 2 illustrates an example powertrain control architecture of the HEV of FIG. 1, in accordance with the principles of the present application.

With additional reference to FIGS. 2 and 3, the powertrain control system 14 will be described in more detail. FIG. 2 illustrates an example control architecture 100 of the powertrain control system 14, and FIG. 3 illustrates an example block diagram 150 of the power-split architecture of the powertrain 12.

As shown in FIG. 2, the powertrain control architecture 100 includes the hybrid powertrain 12 in signal communication with a CPU or controller 102. BC 104 is a wired buffer-crank measurement of the engine speed and position, and CAN 106 is a controller area network connection between the powertrain 12 (and the MCP 60 and sensor(s)) and the controller 102 where the main compensation algorithm resides.

In the example embodiment, the controller 102 also includes a cylinder torque model 108, a position estimator 110, and a compensator 112. The cylinder torque model 108 is configured to model the torque within the engine 20 when it is not firing. In one example, the cylinder torque model 108 computes the in-cylinder pressure for each cylinder based on engine and valve position. The pressures are then converted into torque and all of the cylinder contributions are added together to obtain the equivalent torque signature of the engine as a whole. The position estimator 110 is a Kalman filter with horizon that predicts/estimates the future position of the engine to compensate for measurement and actuation delays (m and a). The compensator 112 is an advance algorithm, based on a model of the physical systems, that generates specific compensation torques to be actuated by motors 24, 26 based on the position of the engine 20.

Figure 3:
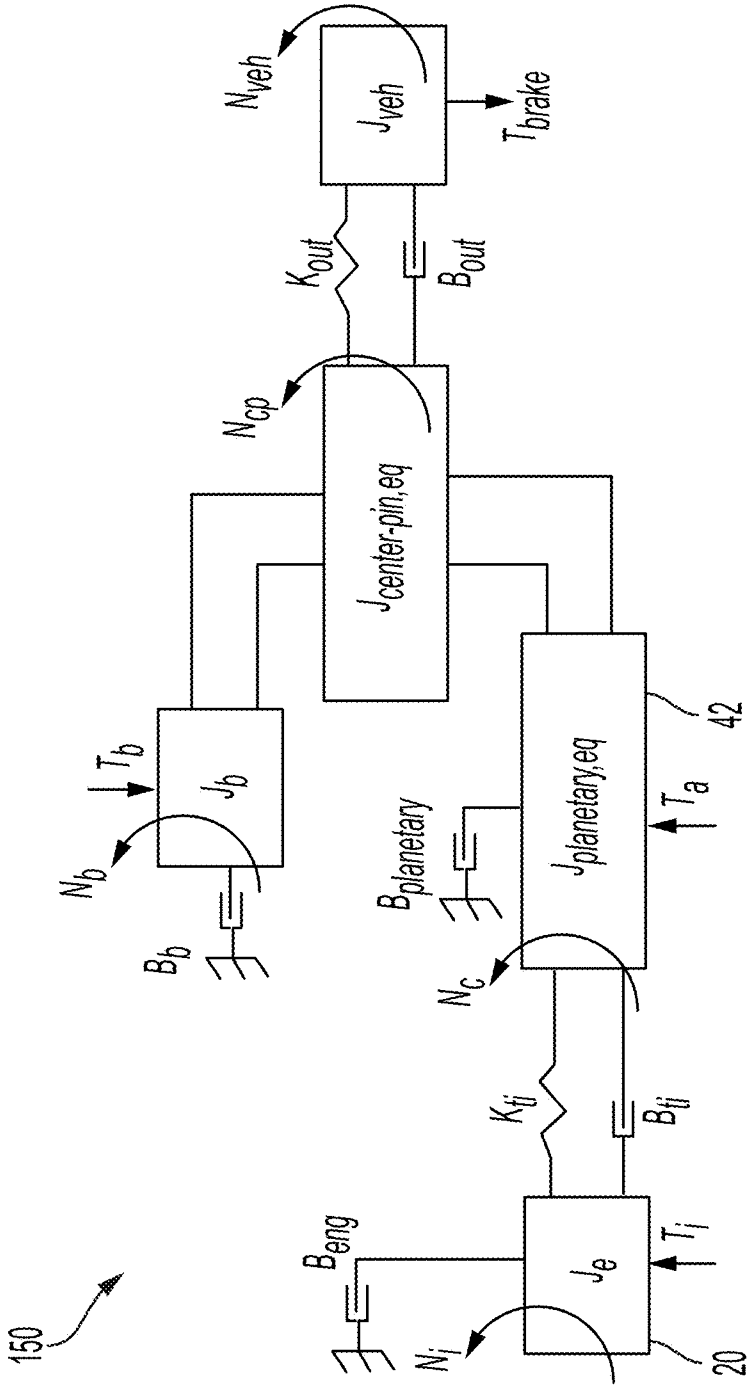
FIG. 3 is a block diagram of an example power-split architecture of the HEV of FIG. 1, in accordance with the principles of the present application.

As shown in FIG. 3, the driveline model 150 assumes a rigid structure for the planetary gearset 42 and other components, with the exception of the shaft connecting the engine 20 to the transmission input. Given the primary focus on engine pulses, incorporating shaft stiffness within the output shaft may be unnecessary. Moreover, empirical observations support the assumption of a rigid planetary assembly.

The architecture of the supervisory controller 102 includes an open loop control contribution, which dictates the operating condition of the powertrain 12 by commanding motor and engine torques. This supervisory control determines these torques by leveraging a rigid model of the powertrain 12. Consequently, the open loop component of motor torques and speed references generated by the supervisory controller 102 can be treated as equivalent quantities within a rigid powertrain framework. Therefore, all speeds and torques within the powertrain can be considered at "steady state" (e.g., at the operating condition dictated by the supervisory control with the exception of the engine node). This is because the supervisory controller does not consider the engine pulse dynamics, nor the stiffness of the input shaft.

This simplification allows isolation of the engine's dynamics and disregards torques related to the operating condition, noting that the compensation torques applied by the motors 24, 26 are not utilized for estimation purposes in this context.

In order to establish the current engine operating point, the speed reference generated by the torque supervisor 102 is configured to compute the current engine position by the following Equation (1).

$$\theta_{i,op}(k+1) = \theta_{i,op}(k) + N_{i,ref}(k) \cdot T_s \tag{1}$$

Where $\theta_{i,op}$ is the engine position at the current operating point, $N_{i,ref}$ is the speed reference, and $T_s$ is the sampling time of the algorithm.

It should be noted that the measurement update within the horizon estimation will enhance the accuracy of the estimated position. The primary motivation for utilizing the reference speed as an input to the position estimation process lies in its inherent synchronization with other supervisory commands.

Further, an important element to consider while estimating the position of the engine is the variation in speed caused by the pulsations. These variations can be effectively estimated using a model-oriented approach tailored for the powertrain. A corresponding block diagram and free body diagram 200 of the engine under these assumptions is shown in FIG. 4.

Figure 4:
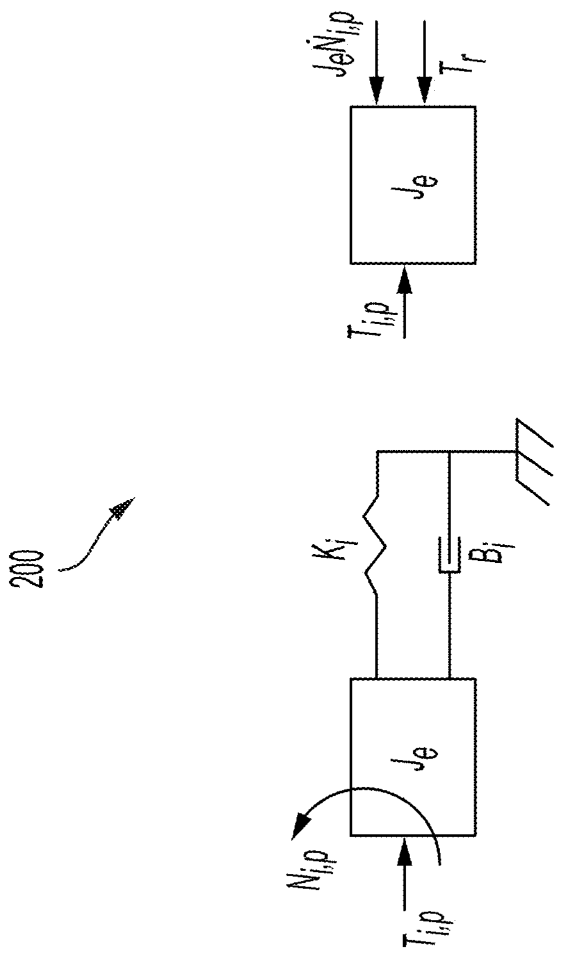
FIG. 4 is an example free body diagram at an engine equivalent node, in accordance with the principles of the present application.

With continued reference to FIGS. 2-4, the dynamic equations can be stated as:

$$T_{i,p} - J_e \dot{N}_{i,p} - T_r = 0 \tag{2}$$

Where $T_{i,p}$ is the pulsating torque from the engine, $\dot{N}_{i,p}$ is the acceleration due to the pulsating torque, $J_e$ is the equivalent engine inertia, and $T_r$ is the resistive torque.

$$T_r = K_i \theta_{i,p} + B_i N_{i,p} \tag{3}$$

Where $K_i$ is the equivalent stiffness of the shaft, Bi is the equivalent damping and friction of the shaft $N_{i,p}$ and $\theta_{i,p}$ is the speed and position of the engine. The quantities presented in Equations (2) and (3) represent deviations from the operating point of the equivalent rigid powertrain. The pulsating torques, denoted as $T_{i,p}$ can be reliably estimated as a function of engine position by leveraging calibration tables derived from engine dynamometer tests equipped with torque sensors. Once the dynamics of engine pulses are incorporated into the model, the overall speed can be accurately determined by combining the reference speed profile with the estimated pulsating torque, as in Equation (4).

$$\begin{aligned} \theta_i(k+1) &= \theta_i(k) + N_{i,ref}(k) \cdot T_s + \theta_{i,p}(k) \\ \theta_{i,p}(k+1) &= \theta_{i,p}(k) + N_{i,p}(k) \cdot T_s \\ N_{i,p}(k+1) &= N_{i,p}(k) + \dot{N}_{i,p}(k) \cdot T_s \\ \dot{N}_{i,p}(k+1) &= \frac{T_{i,p}}{J_e} - \frac{K_i}{J_e}\theta_{i,p}(k) - \frac{B_i}{J_e} N_{i,p}(k) \end{aligned} \tag{4}$$

Equation (4) can be rewritten in linear system form, as follows:

$$\begin{aligned} x(k+1) &= Ax(k) + Bu(k) + Gw(k) \\ y(k) &= Cx(k) + Du(k) + v(k) \end{aligned} \tag{5}$$

Where it considers added unbiased process noises w(k) and measurement noise v(k). With covariances:

$$E[ww^T] = Q_{KF},\ E[vv^T] = R_{KF},\ E[wv^T] = 0 \tag{6}$$

The state space is estimated using the following Kalman filter equation:

$$\hat{x}(k+1) = A\hat{x}(k) + Bu(k) + L_{KF}(y_{KF}(k) - C\hat{x}(k) - Du_{KF}(k)) \quad (7)$$

Where $L_{KF}$ is computed in such a way that the state estimate $\hat{x}$ (k) minimizes the expected square error using the sensor measurement y.

States can be selected as engine position, $\theta_i$, engine position variation due to engine pulses, $\theta_{i,p}$, and engine speed variation due to engine pulses, $N_{i,p}$.

Commanded reference engine speed profile, $N_{i,ref}$ and engine pulse estimation, $T_{i,p}$ are used as inputs to the estimation dynamic.

Actual measured engine position, $\theta_{i,meas}$ and derived engine speed delta, $N_{i,p,calc}$ are used as measurement feedback.

Where the variation due to pulsation in engine speed $N_{i,p,calc}$ is computed from measured engine speed and carrier speed:

$$N_{i,p,calc} = N_i - N_c \quad (8)$$

Where the carrier speed $N_c$ is obtained from the motor A and B measured speeds $N_a$, $N_b$, using the rigid planetary gear equation.

The system also includes two asynchronous measurements. The first measurement, the buffered crank (BC) position, provides information regarding engine speed and position. Given the wired connection of this sensor, measurement delays are negligible. Consequently, for this measurement, prediction is only required up to the actuation delay, unaffected by the measurement delays. The second set of measurements, motor speeds, is utilized to calculate $N_{i,p,calc}$. These measurements are subject to measurement delays. To effectively combine these two measurements, synchronization is essential. For the example system, a design choice was made to implement two measurement updates within the prediction horizon to ensure accurate synchronization of the available measurement data with the system dynamics while being able to leverage the most recent information available at the controller 102. It will be appreciated that other combinations are possible.

The measurement affected by the largest amount of delay is the variation in speed $N_{i,p,calc}$. If the estimation process is limited to the crank position measurement alone, the system is unobservable. To address this challenge, it is necessary to incorporate engine position data into the measurement update. To achieve synchronization, the buffered crank engine position and speed measurements are delayed by the estimated measurement delay associated with the motor speeds measurement. This strategic adjustment ensures proper alignment between the measurements.

In the first iteration, the measurement feedback update through the Kalman Filter algorithm leverages both $N_{i,p,calc}$ and $\theta_i$. Therefore, the output matrix for the first step of the horizon is defined as:

$$C_{kf,1} = \begin{bmatrix} 1 & 0 & 0 \\ 0 & 0 & 1 \end{bmatrix} \quad (9)$$

For the second update, the estimation process exclusively focuses on the crank position state. This approach is feasible as the system remains observable when crank position is the sole output. Moreover, the crank position measurement is received at the CPU of interest with minimal delay, allowing to update the estimation within the horizon with the latest information. Therefore, the output matrix designed for the second measurement update is the following:

$$C_{kf,mid} = [1 \ \ 0 \ \ 0] \quad (10)$$

Overall, the complete closed-loop delays affecting the buffer crank measurements, both speed and position, correspond to equivalent sampling times. In contrast, the total amount of delays affecting the motor speeds, used to compute carrier speed and engine speed variation, correspond to 'a+m' equivalent sampling times.

To summarize, the horizon utilized in this case is characterized by a total 'a+m' steps. The initial step involves incorporating the first measurement update incorporating all measurements properly synchronized. Subsequently, the algorithm estimates the system's dynamics using the physics-based model. At the m-th step, the second measurement update is implemented, focusing exclusively on crank position. For the remaining 'a' steps within the horizon, the algorithm continues to predict the expected states using the model. It will be appreciated that the measurement and actuation time delays can accurately be determined by performing a step response of the motors.

In this way, the described systems and methods provide a horizon-based prediction of the current position and speed of the engine shaft. The system uses an estimation-oriented, physics-based model of the driveline focused on the engine shaft speed, with a proper combination of measurement utilized to improve the prediction through a typical Kalman filter based measurement update, and a proper sequence and timing of such measurement update. Accordingly, compared to previous solutions, this strategy is configured to accurately predict both position and speed of the engine at the time frame of reference of the CPU where the compensation algorithm resides, effectively reducing the equivalent closed loop delay that the controller experiences to zero.

Figure 5A:
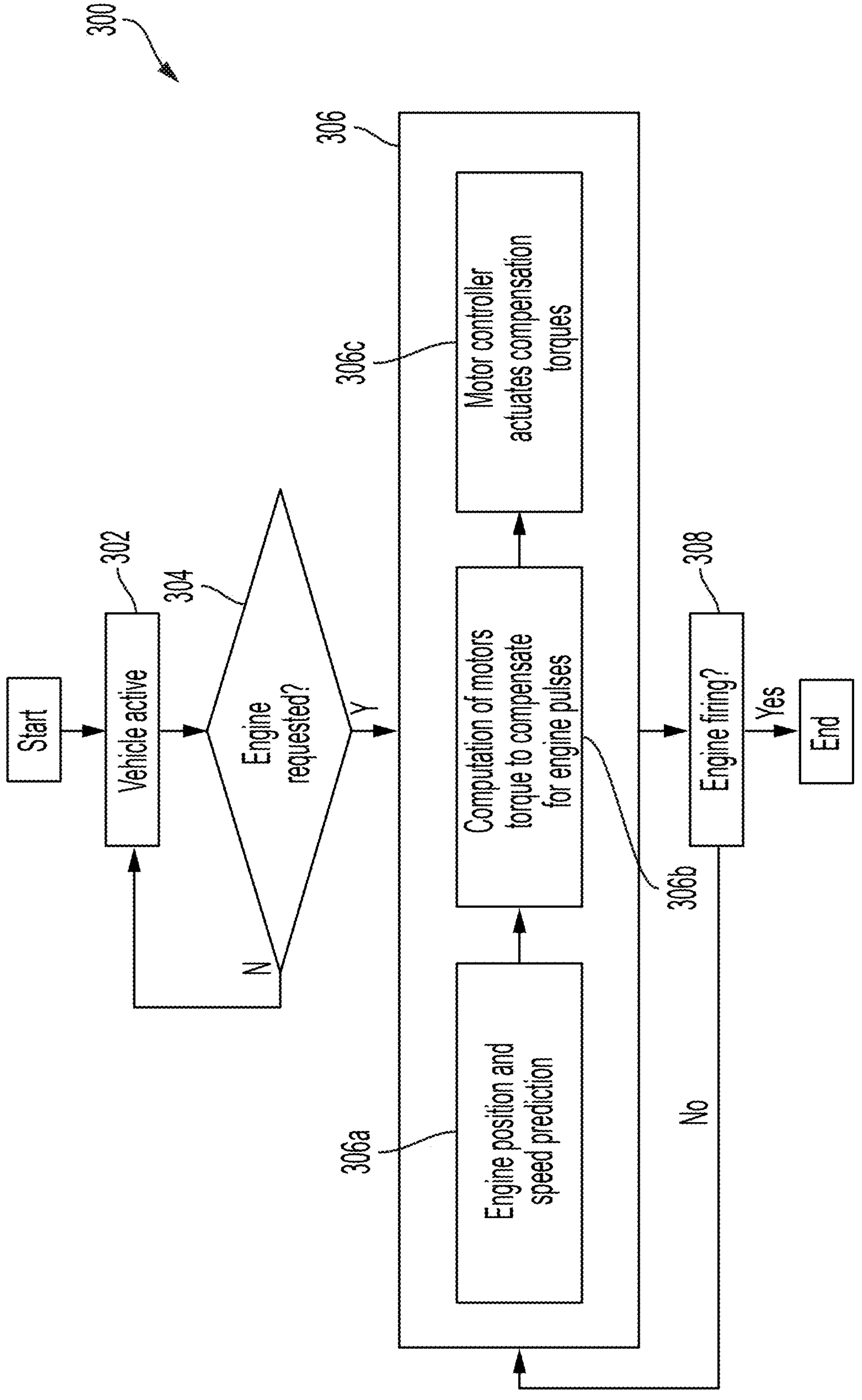
FIG. 5A illustrates an example control logic flow for a method of operating a powertrain control system to address time delay compensation when an engine start is requested, in accordance with the principles of the present application.

With reference now to FIG. 5A, a flow diagram of an example method 300 of operating powertrain control system 14 to integrate Kalman filtering with horizon prediction to address time delay compensation is illustrated according to the principles of the present application. While the method 300 specifically references the HEV 10 and its components for illustrative/descriptive purposes, it will be appreciated that the method 300 could be applicable to any suitably configured electrified vehicle.

In the example embodiment, the method begins at 302 and a supervisory controller ("control"), such as controller 102, determines the vehicle is active (e.g., powered on). At 304, control determines if engine power is requested. If no, control returns to 302. If yes, control proceeds to 306 and performs the following steps. At 306*a*, control determines the engine position and speed prediction, as previously described herein. At 306*b*, control performs a computation of motor torques to compensate for engine pulses. At 306*c*, MCP 60 (or other suitable controller) actuates the previously determined compensation torques. Control then proceeds to 308 and determines if the engine 20 is firing. If no, control returns to 306. If yes, control ends or returns to 302.

Figure 5B:
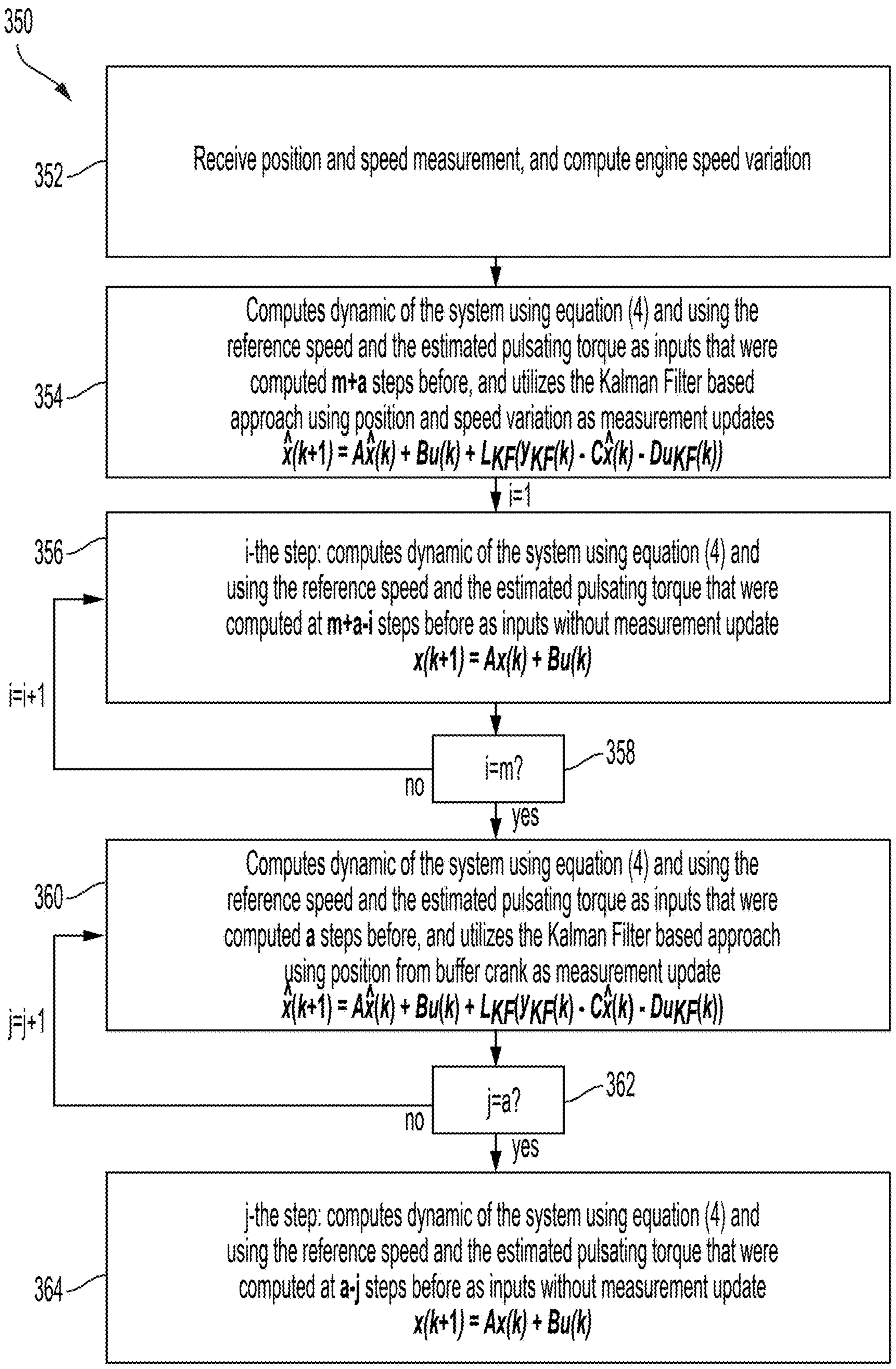
FIG. 5B illustrates an example control logic flow the method of operating the powertrain control system to address time delay compensation, in accordance with the principles of the present application.

With reference now to FIG. 5B, a flow diagram of an example method 350 of operating powertrain control system 14 to integrate Kalman filtering with horizon prediction to address time delay compensation is described in more detail. This method 350 may be utilized for the previous step 306*a* described in FIG. 5A. In the example embodiment, the method begins at 352 where control receives engine position and speed measurements from powertrain 12, and subsequently computes engine speed variation. At 354, control computes the system dynamics, for example, utilizing Equation (4), the reference speed and estimated pulsating torque as inputs that were computed 'm+a' steps previously, and the Kalman filter based approach using position and speed variation as measurement updates.

At 356, control computes the system dynamics utilizing Equation (4) and the reference speed and the estimated pulsating torque that were computer at 'm+a−i' steps previously as inputs without measurement update. At 358, control determines if i=m. If no, control returns to 356. If yes, control proceeds to 360 and computes the system dynamics utilizing Equation (4), the reference speed and the estimated pulsating torque as inputs that were computed 'a' steps previously, and the Kalman filter based approach using the position from buffer crank as a measurement update.

At 362, control determines if j=a. If no, control returns to 360. If yes, control proceeds to 364 and computes the system dynamics utilizing Equation (4) and the reference speed and estimated pulsating torque that were computed at a-j steps previously as inputs without a measurement update. Control then ends or returns to 352 after another engine start.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A hybrid electric vehicle (HEV), comprising:

an electrified powertrain and driveline including an internal combustion engine, a first electric motor configured as a starter/generator, and a second electric motor configured as an electric traction motor; and a powertrain control system, including a controller having a compensation algorithm to estimate engine pulses based on engine position and speed data, the powertrain control system programmed to:

determine the HEV is active;

determine an activation request for the engine;

predict, by the compensation algorithm, a position and speed of the engine to reduce closed loop measurement and actuation delays of the controller to zero;

determine, by the controller, a motor torque to compensate for the engine pulses, based on the predicted position and speed of the engine; and operate the first and/or second electric motors with the determined motor torque to compensate for the engine pulses.

2. The HEV of claim 1, wherein when predicting the position and speed of the engine, the powertrain control system is further programmed to:

receive, by the controller, engine position and speed measurements;

estimate, by the controller, engine position and speed variation caused by the engine pulses; and estimate, by the controller and a physics-based model, system dynamics of the engine after a time step M+A to thereby predict future system dynamics, where M corresponds to a measurement delay associated with the powertrain control systems, and where A corresponds to an actuation delay associated with the powertrain control system and the electrified powertrain and the driveline.

3. The HEV of claim 2, wherein the controller utilizes a Kalman filter with the received engine position and speed variation as measurement updates.

4. The HEV of claim 3, wherein the controller further utilizes a cylinder torque model configured to estimate a torque signature of the engine during a start when the engine is put in rotation without firing cylinders of the engine.

5. The HEV of claim 3, wherein when predicting the position and speed of the engine, the powertrain control system is further programmed to:

perform a first measurement feedback update through the Kalman filter utilizing (i) the previously received engine position and speed measurement and (ii) the estimated engine position and speed variation caused by the engine pulses.

6. The HEV of claim 5, wherein when predicting the position and speed of the engine, the powertrain control system is further programmed to:

perform a second measurement feedback update through the Kalman filter utilizing a buffer crank position as a measurement update.

7. The HEV of claim 1, wherein the electrified powertrain and driveline further includes an electrically variable transmission with a power splitting planetary gear set.

8. The HEV of claim 7, wherein the electrified powertrain and driveline are absent a clutch to disconnect the engine from the electrified powertrain.

9. The HEV of claim 1, wherein the first electric motor is configured to actuate the engine.

10. The HEV of claim 1, wherein the engine is wired to the controller to provide a buffer-crank measurement of engine speed and position with negligible delay.

11. A method of operating an electrified power-split hybrid powertrain of a hybrid electric vehicle (HEV) having a driveline with an internal combustion engine, a first electric motor configured as a starter/generator, and a second electric motor configured as an electric traction motor, the method comprising:

determining the HEV is active;

determining an activation request for the engine;

predicting, by a controller having a compensation algorithm to estimate engine pulses based on engine position and speed data, a position and speed of the engine to reduce closed loop measurement and actuation delays of the controller to zero;

determining, by the controller, a motor torque to compensate for the engine pulses, based on the predicted position and speed of the engine; and operating, by the controller, the first and/or second electric motors with the determined motor torque to compensate for the engine pulses.

12. The method of claim 11, wherein when predicting the position and speed of the engine, the method includes:

receiving, by the controller, engine position and speed measurements;

estimating, by the controller, engine position and speed variation caused by the engine pulses; and estimating, by the controller and a physics-based model, system dynamics of the engine after a time step M+A to thereby predict future system dynamics, where M corresponds to a measurement delay associated with the powertrain control systems, and where A corresponds to an actuation delay associated with the powertrain control system and the electrified powertrain and the driveline.

13. The method of claim 12, further comprising utilizing, by the controller, a Kalman filter with the received engine position and speed variation as measurement updates.

14. The method of claim 13, further comprising utilizing, by the controller, a cylinder torque model configured to estimate a torque signature of the engine during a start when the engine is put in rotation without firing cylinders of the engine.

15. The method of claim 13, wherein when predicting the position and speed of the engine, the method further comprises:

performing, by the controller, a first measurement feedback update through the Kalman filter utilizing (i) the previously received engine position and speed measurement and (ii) the estimated engine position and speed variation caused by the engine pulses.

16. The method of claim 15, wherein when predicting the position and speed of the engine, the method further comprises:

performing, by the controller, a second measurement feedback update through the Kalman filter utilizing a buffer crank position as a measurement update.

17. The method of claim 11, wherein the electrified power-split hybrid powertrain and driveline further include an electrically variable transmission with a power splitting planetary gear set.

18. The method of claim 17, wherein the electrified power-split hybrid powertrain and driveline are absent a clutch to disconnect the engine from the electrified powertrain.

19. The method of claim 11, wherein the first electric motor is configured to actuate the engine.

20. The method of claim 11, wherein the engine is wired to the controller to provide a buffer-crank measurement of engine speed and position with negligible delay.

* * * * *